Dec. 6, 1966   C. W. RENN ET AL   3,290,684
DIRECTIONAL RECEIVING SYSTEMS
Filed Oct. 3, 1960   3 Sheets-Sheet 3
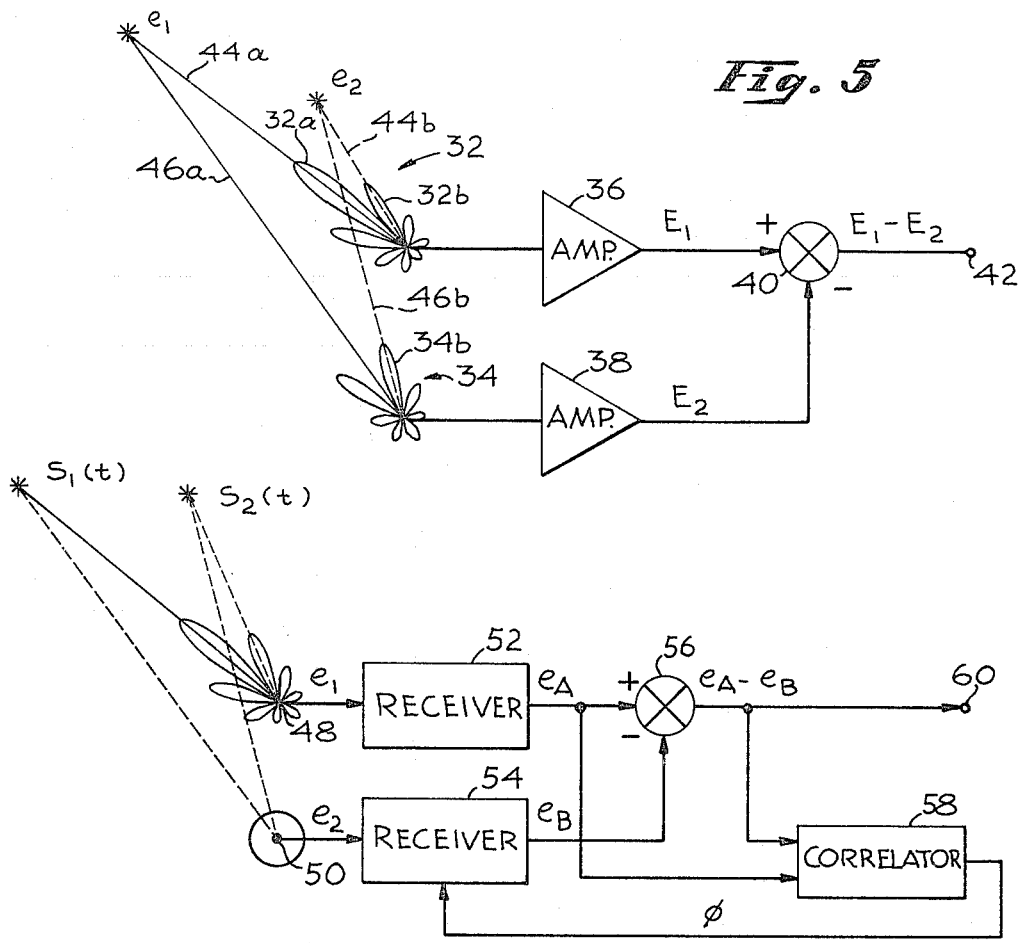
*Fig. 5*
*Fig. 6*
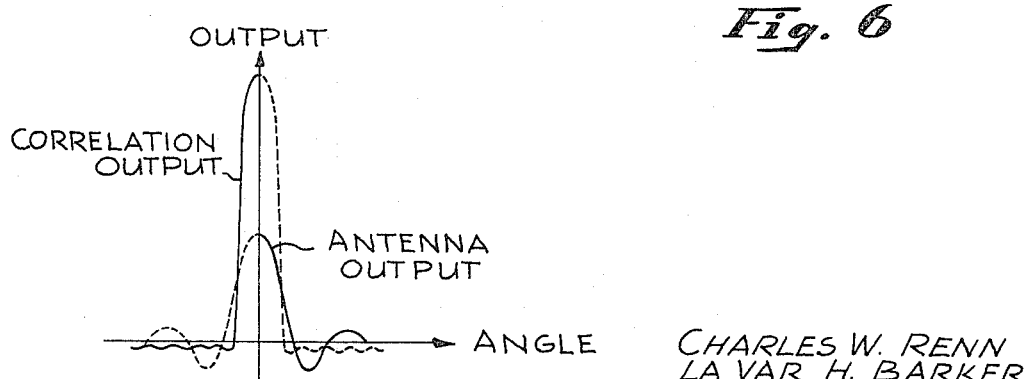
*Fig. 4*
CHARLES W. RENN
LA VAR H. BARKER
ARNOST A. HORAK
INVENTORS
BY
Morris Spector
ATTORNEY : 3,290,684
DIRECTIONAL RECEIVING SYSTEMS
Charles W. Renn, San Pedro, and La Var H. Barker, Woodland Hills, Calif., and Arnost A. Horak, Garland, Tex., assignors to TRW Inc., a corporation of Ohio
Filed Oct. 3, 1960, Ser. No. 60,213
25 Claims. (Cl. 343—100)

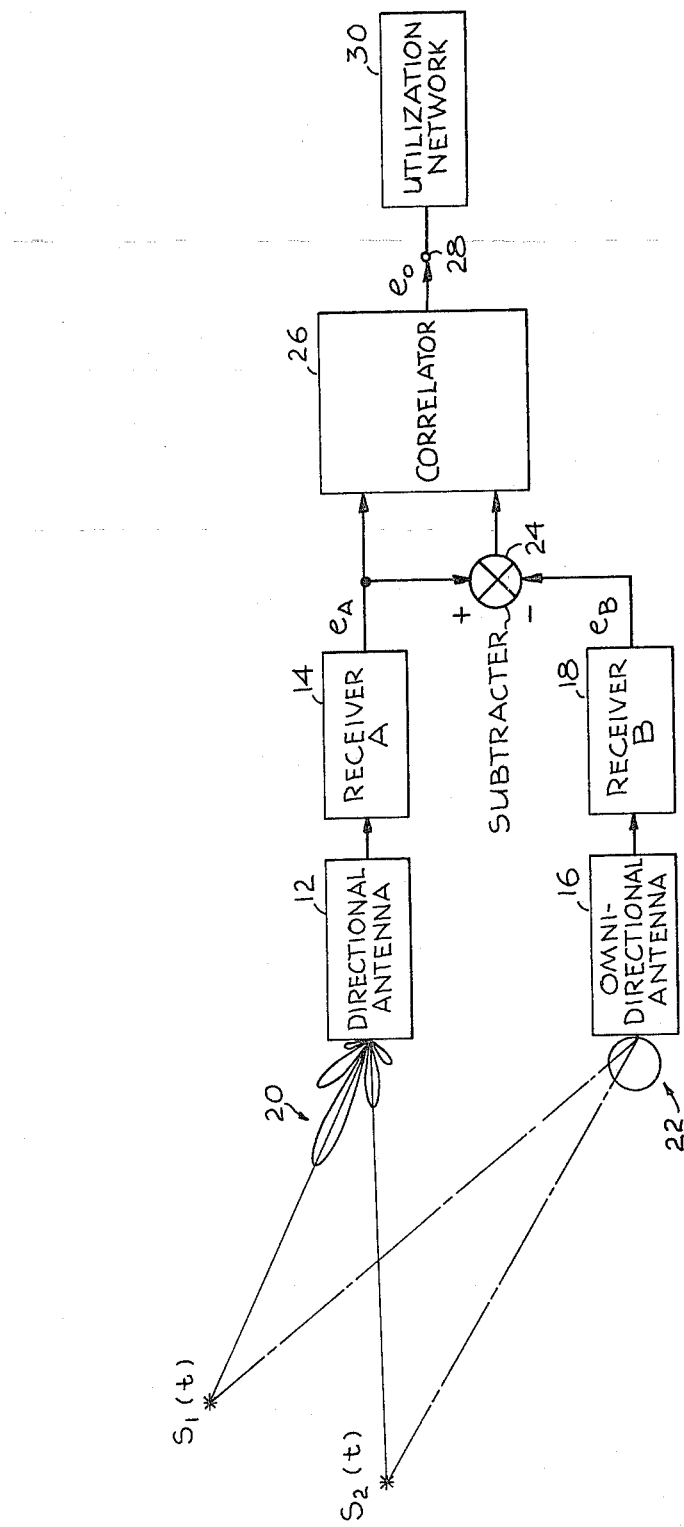

This is a continuing patent application of U.S. patent application, Serial No. 717,261, entitled "A Directional Receiving System" by Charles W. Renn, La Var H. Barker and Arnost A. Horak, filed February 24, 1958, now abandoned, and includes matter disclosed in the U.S. patent application, Serial No. 717,262, entitled "A Directional Receiving System," also filed February 24, 1958 by the same inventors, also now abandoned.

The present invention relates in general to directional receiver systems and more particularly to method and apparatus for substantially increasing the ability of directional receiver systems to determine the bearing angle of individual sources emanating wave energy.

Many applications of wave radiation require a device which will receive wave energy in a preferred direction, a directional antenna is an example of such a device. Systems that employ a directional antenna generally have two important advantages over a non-directional system. First, sources emanating wave energy may be detected in the presence of a large nonisotropic background noise, that is to say, the signal-to-noise ratio can be improved. Second, the resolving power of the receiver system is increased with the result that sources emanating wave energy which have different bearing angles from the receiver system can be separated or, stated differently, individually distinguished.

When a highly directional antenna is constructed to receive wave energy, the resultant antenna field pattern generally has a characteristic distribution of the form $$I = A \frac{\sin e\ \theta}{\theta}$$

where I is the intensity of the received wave energy and $\theta$ is the angle between a first line connecting the source emanating wave energy and the location of the receiver system and a second fixed reference line passing through the receiver location. Graphically plotting this mathematic expression yields an intensity pattern whose main features are a single main lobe plus a theoretically symmetrical distribution of minor lobes or "side" lobes.

As is well known by those skilled in the antenna art, where an antenna has such a field pattern, the intensity of a wave energy received in the direction of the main lobe will be substantially greater than that of an identical wave energy arriving in the direction of a side lobe. Consequently, it would ordinarily be expected that it would be possible to monitor received wave energy intensity and thereby discriminate between sources emanating wave energy from different bearing angles. Unfortunately, however, this is not always possible.

The presence of the side lobes complicate the situation so that in the usual case it is quite possible for a powerful radiating source transmitting in the direction of a side lobe to completely overshadow or mask a weaker wave energy simultaneously received from the general direction of the main lobe. For example, it is possible for a nearby radio station to mask a signal emanating from a distant source, such as an aircraft, the direction of which aircraft it is desired to be determined. Thus, the conventional directional receiver system cannot be relied upon to accurately distinguish between sources emanating wave energy at different bearing angles.

It is, therefore, an object of the present invention to provide means which will improve the ability of directional receiver systems to locate particular ones of a plurality of sources emanating wave energy in the vicinity of a directional receiving system.

In accordance with the above object, in general, the present invention provides means which, in combination with the conventional directional receiver system, will produce an indicator signal, variations in the magnitude of which will accurately represent position selective detection of particular sources emanating wave energy relative to an observation location. Basically, to develop such an indicator signal, wave energy emanating from sources in the vicinity of the observation location is separately received by a relatively directional and a relatively nondirectional receiving means to respectively develop first and second alternating current signals. These signals are then applied to a subtracter to develop a remainder signal. The remainder signal is, in turn, applied to a signal comparator unit where it is multiplied and time-averaged with one of the alternating current signals to develop an output signal. In a first form of this invention, variations in the magnitude of the output signal depict position selective detection of sources emanating wave energy in the vicinity of observation location. Thus, the output signal may be directly utilized as the indicator signal to indicate the position of particular sources emanating wave energy. Further, in a second form of the present invention, the above output signal is utilized to control the amplitude of at least one of the alternating current signals reaching the subtracter such that the remainder signal becomes an indicator signal, variations in the magnitude of which depict position selective detection of particular sources emanating wave energy.

More particularly, in accordance with the first form of the present invention, the disadvantages and limitations of earlier types of directional receiver apparatus are overcome by increasing the resolving power of such apparatus. This is accomplished by converting, in one sense, wave energy received in the direction of the side-lobes of a directional receiver into a direct-current signal of opposite polarity to that obtained by the conversion of wave energy received in the main lobe direction. Generally, in accordance with the first form of the present invention, this is accomplished by providing two separate signal receiving channels A and B, channel A including a relatively directional receiving means having at least a main lobe and a first pair of side lobes and channel B including a relatively nondirectional receiving means positioned in the proximity of the directional receiving means. The signals developed at channels A and B in response to wave energy received thereby from sources emanating wave energy in the vicinity of the directional receiving system are utilized to produce a difference or remainder signal. The remainder signal is then applied to a signal correlator network which will multiply the remainder signal with the signal developed at at least one of the signal receiving channels to develop a product signal. The product signal thus developed is then time-averaged by the correlator to produce a substantially direct current output signal, variations in the magnitude of which depict position selective detection of sources emanating wave energy relative to the directional antenna.

More specifically, the two channels may be adjusted such that the overall gain of the directional receiving channel A has a gain $A_0$ for the main lobe and $A_1$ for the first side lobe, and the overall gain of the relatively nondirectional channel B has a gain $B_0$ which is adjusted so that $A_1 \leq B_0 < A_0$. Thus, when energy emanating from two sources having different bearing angles are received in the two channels, the signals derived therefrom may be applied to subtracter and correlator networks wherein they may be processed in such a manner that a final output signal is produced which is positive only when a source emanating wave energy lies in the direction of the main lobe. On the other hand, when none of the sources lies in the direction of the main lobe, the output signal will either be zero or negative depending upon the relative values of $A_1$ and $B_0$ and the strength of the wave energy received in the direction of the side-lobes.

Thus, through the combined use of only three basic components, namely, a relatively nondirectional receiving means, a subtracter and correlator, the resolving power of a directional receiver system can be markedly improved as well as the ability to discriminate against sources within the side-lobe field. This technique of the present invention is especially attractive because it is simple and involves equipment that is readily available and, more important, it may readily be adapted to any arbitrary directional receiver system presently in use.

In accordance with the second form of the present invention, the disadvantages and limitations of earlier types of directional receiver apparatus may be overcome by eliminating to a substantial extent the inherent side-lobe character of directional receiver systems. In accordance with the basic concept of the second form of the present invention, this is done by artificially producing an additional side-lobe pattern which is almost identical to the first and whose effects are subtracted therefrom. More particularly, this is accomplished by providing two separate signal receiving channels A and B. Channel A includes a relatively directional receiving means having a main lobe and undesirable side-lobe characteristics and channel B includes a relatively nondirectional receiving means positioned in the proximity of the former. When wave energy is received in the two channels, the two alternating current signals derived therefrom are applied to a subtracter network to develop a remainder signal. The remainder signal and at least a one of the alternating current signals are then applied to a signal comparator network, such as a correlator network, wherein they are processed in such a manner that the signal comparator produces an output signal that may be used to automatically control the amplitude of the signal delivered by channel B to the subtractor. Specifically, the output of the signal comparator is fed back to channel B in order to vary the gain of channel B in such a way that when wave energy, such as an echo, is being received in the direction of the main lobe of the directional receiving means, the alternating current signal produced by channel B approximates rather closely side-lobe signals which are produced at the output of channel A by wave energy penetrating the side lobes of the directional receiving means. When one alternating current signal is then subtracted from the other, as is done in the subject embodiment, the remainder signal produced by the system of the present invention substantially contains only signal components resulting from wave energy received by the directional receiving means in the direction of the main lobe. Thus, the masking effect of wave energy emanating from relatively high energy sources is substantially eliminated and sources of relatively low energy can be located.

The novel features which are believed to be characteristic of the invention, both as to its organization and method of operation, together with further objects and advantages thereof, will be better understood from the following description considered in connection with the accompanying drawings.

FIGURE 3 is a block diagram of an embodiment of a directional receiver system according to the first form of the present invention;

FIGURE 4 is a graphical comparison of the outputs obtained from a directional receiver system modified in accordance with the first form of the present invention and from an unmodified system;

FIGURE 5 is a block diagram of a circuit which may be used to explain the basic principles of the second form of the present invention; and FIGURE 6 is a block diagram of an embodiment of a directional receiver system according to the second form of the present invention.

Figure 1:
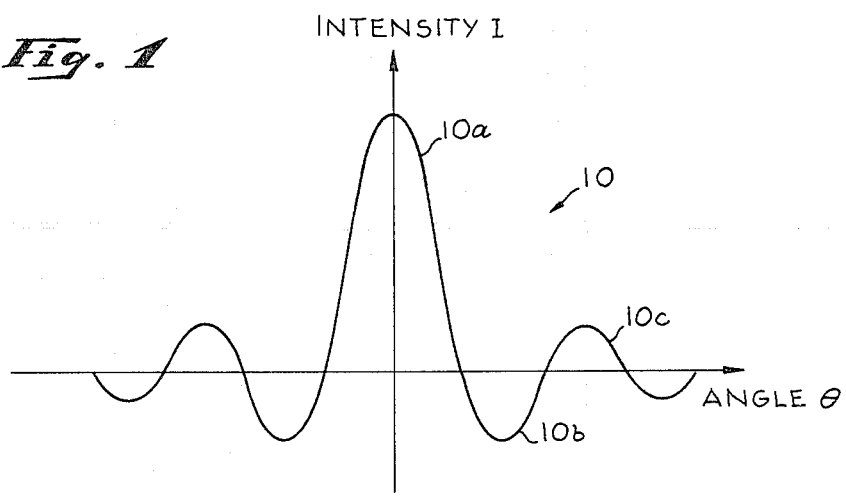
FIGURE 1 is a representation in rectangular coordinates of the field pattern of a directional antenna.

Referring now to the drawings, there is shown in FIGURE 1 a curve, generally designated 10, which represents the field pattern of intensity for a highly directional antenna designed to receive wave energy. Curve 10 is a plot in rectangular coordinates of the mathematical equation $$I = \frac{\sin \theta}{\theta}$$

where $\theta$ is the bearing angle, that is, the angle that the line joining the receiver system and a source emanating wave energy forms with a fixed reference line of direction, and I is the intensity of the wave energy received from the source. As is shown, curve 10 is symmetrical and resembles the locus of a damped sinusoidal oscillation, each loop of the curve corresponding to a lobe of the antenna pattern. Since loop 10a has such a significantly greater amplitude than the other loops, such as loops 10b and 10c, it will be recognized by those skilled in the art that loop 10a therefore corresponds to the main lobe and loops 10b and 10c correspond to the side-lobes of the field pattern.

Figure 2:
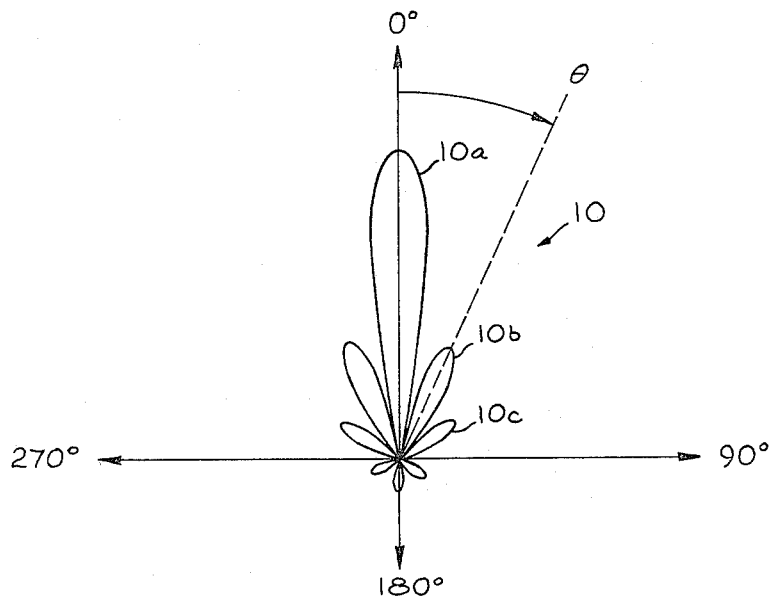
FIGURE 2 is a representation in polar coordinates of the field pattern of a directional antenna.

The equation $$I = \frac{\sin \theta}{\theta}$$

is also shown plotted in polar coordinates in FIGURE 2, the corresponding parts of the curves of FIGURES 1 and 2 being similarly designated to facilitate an understanding of the discussion. Curve 10 in FIGURE 2 clearly depicts the main and minor lobes of the antenna field pattern and from this curve it is apparent that a wave energy which arrives at the receiver antenna along the 0° line, that is, from a source having a zero bearing angle, will have a substantially greater intensity than identical wave energy arriving along the $\theta$ line. In such a case, it is possible to monitor the received signal intensity and thereby discriminate between sources at different bearing angles. Unfortunately, however, this is a special situation, as mentioned in the introductory matter, and it is quite possible for wave energy emanating from a powerful radiation source at an angle $\theta$ to appear in the receiver as a much stronger signal than that representing wave energy emanating from a weak source along the 0° line. Obviously, therefore, the conventional type of directional antenna cannot reliably separate energy sources having different bearing angles.

Referring now to FIGURE 3, there is shown therein an embodiment of the present invention which involves not only a new and useful combination of circuits to meet the directional receiving problem, but involves also a new method or approach to the solution of that problem. Generally there is shown a directional receiving system for selectively discriminating between a plurality of sources from which emanates detectable wave energy, the sources, represented at $S_1(t)$ and $S_2(t)$, lying in different directions from a first relatively directional receiving means represented at 12 and a second relatively nondirectional receiving means represented at 16. As shown, it is desired to detect the presence of $S_1(t)$ to the exclusion of $S_2(t)$. Therefore, the wave energy emanating from $S_1(t)$ may be considered as desired and that emanating from $S_2(t)$ as undesired. Wave energy emanating from $S_1(t)$ and $S_2(t)$ and detected by the directional and relatively nondirectional receiving means is converted into first and second alternating current signals, both of which include signal components representative of the wave energy emanating from $S_1(t)$ and $S_2(t)$. By limiting the gain of the second receiving means, the signal components of $S_1(t)$ and $S_2(t)$ present in the second alternating current signal, i.e., the signal associated with the nondirectional receiving means, are respectively less and greater than the corresponding components present in the first alternating current singal. In accordance with the present invention, the first and second signals are utilized to develop a difference or remainder signal, the magnitude of which represents substantially the difference between these two alternating current signals. The remainder signal and at least one of the alternating current signals are then mutually processed to produce a product or output signal, the magnitude of which is substantially a direct function of the difference between the time-averaged, squared values of the signal components of $S_1(t)$ and $S_2(t)$ such that variations in the magnitude of this output signal depict position selective detection of sources at $S_1(t)$ and $S_2(t)$ relative to the directional receiving means. Thus, it is in this sense that this output signal may be directly used as an indicator signal. More particularly, the directional receiver system of FIGURE 3 comprises two signal receiving channels which, for convenience, will be referred to as channels A and B, channel A including a directional receiving antenna 12 and a standard radar receiver 14 to which antenna 12 is connected, and channel B including an omnidirectional receiving antenna 16 connected to a standard radar receiver 18. The field patterns for antennas 12 and 16 are illustrated adjacent thereto in the figure and are designated 20 and 22, respectively. Channel A has a gain of $A_0$ for signals received in the direction of the main lobe, a gain of $A_1$ for signals received in the direction of the first side lobe and a gain of $A_n$ for the Nth side lobe. Antenna 16 being omnidirectional, channel B simply has a gain of $B_0$ which is adjusted so that $A_1 \leq B_0 < A_0$.

As shown, the output terminal of receiver 14 is connected to the first of two input terminals of both a subtracter circuit 24 and a correlator network 26, while the output terminal of receiver 18 is connected to the second input terminal of subtracter 24. As illustrated, the output terminal of subtracter 24 is connected to the second input terminal of the correlator network 26. A correlator is a device which multiples two time-varying signals together and then takes a time average of the resulting product. As shown in FIGURE 3, the output signal produced by correlator 26 is applied to a terminal 28 of a utilization circuit 30 which, in one form, may be a display scope.

In this invention, subtracter circuit 24 may take a variety of forms, the simplest of which would be a pair of resistors connected in series, the two input signals being applied to the free ends of the resistors and the output signal being taken off their junction. In this case, the subtracter output signal would be proportional to the difference of the two input signals. Another type of subtracter circuit which could be adapted for use in the circuit of FIGURE 3 may be found on pages 161 through 166 of the book entitled "Electronic Engineering" by Samuel Seely, published in 1956 by the McGraw-Hill Book Company, Inc.

As for correlator 26 various types of correlators and the individual circuits used therein are shown and described on pages 31 to 45 of the Harvard University Technical Memorandum No. 27 entitled "Correlators for Signal Reception" by James J. Faran, Jr. and Robert Hill, Jr., published September 15, 1952.

In considering the operation of the first form of the present invention, it will be assumed that two radiating or energy sources are involved, namely $S_1(t)$ and $S_2(t)$, and that they are located such that, at one moment during the periodical scanning of directional antenna 12, the wave energy from $S_1(t)$ is received in the direction of the main lobe of the scanning antenna and the wave energy from $S_2(t)$ is received in the direction of the first side-lobe, as depicted in FIGURE 3. It will further be assumed that the radiation intensities of the two sources are not restricted in any way.

Accordingly, on the basis of wave energy received from $S_1(t)$ and $S_2(t)$ by receivers 14 and 18 and the various lobe gains mentioned above, the signals produced by receivers 14 and 18 can be written as follows:

$$e_A = K[A_0 S_1(t) + A_1 S_2(t)] \quad (1)$$

$$e_B = K B_0 [S_1(t) + S_2(t)] \quad (2)$$

where $e_A$ is the output of receiver 14, $e_B$ is the output of receiver 18 and $K$ is the overall gain of each of the two receivers.

Signals $e_A$ and $e_B$ are applied to subtracter 24 which produces a remainder signal corresponding to the difference between $e_A$ and $e_B$. Thus, the signal produced by subtracter 24 may be written as $$e_A - e_B = K(A_0 - B_0) S_1(t) + K(A_1 - B_0) S_2(t) \quad (3)$$

Signals $e_A$ and $(e_A - e_B)$ are applied to correlator 26 where they are multiplied together and the product averaged for a predetermined interval of time. Hence, the correlator output $E_0$ at output terminal 28 is $$E_0 = \frac{1}{T} \int_T (e_A)(e_A - e_B) dt \quad (4)$$

The equation for the correlator output may be expanded to yield the following result:

$$E_0 = \frac{1}{T} \int_T K^2 [(A_0)(A_0 - B_0)][S_1(t)]^2 dt +$$

$$\frac{1}{T} \int_T K^2 [(A_1)(A_1 - B_0)][S_2(t)]^2 dt +$$

$$\frac{1}{T} \int_T K^2 [(A_0)(A_1 - B_0) + (A_1)(A_0 - B_0)][S_1(t) S_2(t)] dt \quad (5)$$

The evaluation of the integrals of Equation 5 requires specific knowledge of the energy sources $S_1(t)$ and $S_2(t)$. In this respect, it is assumed that the following conditions exist, namely, (1) The sources radiate energy according to the wave equation, whereby $$\frac{d^2 S}{dx^2} \sim \frac{d^2 S}{dt^2}$$

This would include acoustic as well as electromagnetic radiation;

(2) The system and sources are located within a substantially homogeneous medium;

(3) The sources are independent, that is, noncoherent, so that $S_2(t) \neq f[S_2(t)]$;

(4) The sources are radiating energy with a finite frequency spectrum, such as in the case of pulsed radiofrequency.

In evaluating the integrals of Equation 5 under the four conditions enumerated above, if the integrating time T is made sufficiently large, then the last term in the expansion of $E_0$ approaches zero and the first two terms in the expansion, that is, the terms containing factors of the form $$\frac{1}{T} \int_T [S_2(t)]^2 dt$$

approach some positive valve as a limit. Accordingly, when the integrating time is sufficiently large, Equation 5 for all practical purposes is reduced to:

$$E_0 = \frac{1}{T} \int_T K^2 [(A_0)(A_0 - B_0)][S_1(t)]^2 dt +$$

$$\frac{1}{T} \int_T K^2 [(A_1)(A_1 - B_0)][S_2(t)]^2 dt \quad (6)$$

Further information on this point may be obtained from an article entitled "Statistical Errors in Autocorrelation Measurements of Normal Random Noise Over a Finite Time Interval" by Julius S. Bendat, in report RW 1661.69, published in July, 1956, by the Control Systems Division of the Ramo-Wooldridge Corporation, Los Angeles, California.

The important thing to note in Equation 6 is the difference between the coefficients of the two terms. Since $A_1 \leq B_0 < A_0$, the coefficient $(A_0 - B_0)$ of the first term will at all times be positive whereas the coefficient $(A_1 - B_0)$ will at all times be either zero or negative. Thus, when $S_1(t)$ is in the direction of the main lobe and $S_2(t)$ is in the direction of the first side-lobe, the indicator signal produced by the system will be positive in value as it appears at terminal 28. On the other hand, when both sources lie outside the main lobe, the signal applied by correlator 26 to terminal 28 is negative or else zero amplitude.

Although the above mathematical derivations have been, for simplicity, limited to radiating sources of energy it is, of course, understood that the invention is not limited thereby and also has application where the sources emanating wave energy are sources of reflected wave energy as well as sources of radiation.

In regard to the first form of the present invention, it should be noted that it may be possible for a powerful source $S_2(t)$ to mask the source $S_1(t)$ so that the correlator output would at all times be negative. However, where both sources are radiating sources, as distinguished from the situation where one source is radiating and one source is nonradiating or reflective, such as a mountain, the power and/or range differences required are uncommonly large and hence, in the usual situation, of limited practical importance.

The very marked improvement or advance in the directional receiving art brought about by the present invention may be seen from FIGURE 4 which graphically compares the variations in the output signal of a conventional directional receiver system with that of a system utilizing the features of the present invention. As shown in the figure, the two output curves are superimposed upon each other for convenience of comparison, the usual output curve being designated antenna output and the improved output curve being designated correlation output. It will be noted from FIGURE 4 that the present invention inverts the side-lobe signals or, stated differently, converts the side-lobe signals into a direct-current voltage of opposite polarity to that produced from signals received in the main lobe. Furthermore, it will be noted that the magnitude of signals produced by the correlator in response to wave energy received in the direction of the main lobe is much greater than the magnitude of signals produced by a conventional directional system, the increase being due to the effect of the $S^2$ terms on the correlator output as defined by Equation 6. Hence, the present invention very materially increases the resolving power of directional receiver systems.

As noted above, in the first form of the present invention, when the energy level of signals received in the direction of a side lobe of the directional antenna approaches the energy level of signals received in the direction of the main lobe, the output signal will always be of a negative polarity. Thus, it is possible for powerful wave energy received in the direction of a side lobe of the directional antenna to mask weaker wave energy received in the direction of the main lobe. Under such condition, it may be preferred to employ the second form of the present invention which will be described in detail in connection with FIGURES 5 and 6.

Referring now, specifically, to FIGURE 5 wherein two receiving channels are shown, each channel comprised of an antenna, such as a positionable radar antenna, and an amplifier connected thereto. The radar antennas are not actually shown but, rather, are represented by their associated field patterns which are generally designated 32 and 34. The two amplifiers are designated 36 and 38, amplifier 36 being connected to the antenna having field pattern 32 and amplifier 38 being connected to the antenna having pattern 34. The output ends of the amplifiers are connected to a subtracter circuit 40 whose output signal is applied to an output terminal 42.

Field pattern 32 has a major lobe 32a and a first side-lobe 32b. Field pattern 34, on the other hand, is a replica of the side-lobe structure of pattern 32, that is to say, pattern 34 is identical only with the side-lobe configuration of pattern 32. Accordingly, the side lobe of pattern 34 that corresponds to side lobe 32b of pattern 32 is designated 34b.

FIGURE 5 also shows two sources emanating wave energy represented at $e_1$ and $e_2$, the energy from these sources being received in the direction of main lobe 32a and side lobes 32b and 34b, as indicated by solid and broken lines 44a, 44b, 46a and 46b.

Briefly stated, when wave energy is received in the directions mentioned from sources $e_1$ and $e_2$, the signals developed by the two antennas are first mixed and then subtracted and, in consequence thereof, the resultant output or remainder signal at terminal 42 is free of any side-lobe effects or, stated differently, consists solely of the main lobe signal. Such a result may be shown mathematically.

Thus, if $E_1$ is the signal produced at the output of amplifier 36;
$E_2$ is the signal produced at the output of amplifier 38;
$A_0$ is the gain for the main lobe of the antenna having field pattern 32;
$A_1$ is the gain for the first side lobe of the antenna having field pattern 32;
$B_1$ is the gain for the first side lobe of the antenna having field pattern 34;
$K_1$ is the gain for amplifier 36;
$K_2$ is the gain for amplifier 38; and
$E_0$ is the final signal output;

Then $$E_1 = K_1[A_0 e_1 + A_1 e_2] \quad (7)$$

and $$E_2 = K_2[B_1 e_2] \quad (8)$$

It will be noted that since antenna pattern 34 does not include a main lobe and, further, since the signal propagated along path 44a arrives along the void in the field pattern created by the absence of a main lobe, that Equation 8 does not include a signal component for $e_1$.

Applying signals $E_1$ and $E_2$ to subtracter circuit 40 which produces a remainder signal equal to the difference between the two input signals thereto, we obtain a signal at terminal 42 as follows:

$$E_0 = E_1 - E_2 = [K_1 A_0] e_1 + [K_1 A_1 - K_2 B_1] e_2 \quad (9)$$

Accordingly, if $$K_1 A_1 = K_2 B_1 \quad (10)$$

Then, $$E_0 = [K_1 A_0] e_1 \quad (11)$$

From Equation 11 it is seen that only the main lobe signal appears at output terminal 42.

While the system shown in FIGURE 5 has been useful in illustrating the basic principles of the present invention which involve side-lobe cancellation, such a system is impractical because the second antenna is not physically realizable, that is to say, an antenna having a field pattern 34 which exactly duplicates the side-lobe structure of pattern 32 cannot be constructed. However, it is possible to include a combination of circuits in any system that can be used in conjunction with an antenna that crudely approximates the undesired side-lobe pattern to yield a high degree of cancellation.

Referring therefore to FIGURE 6, there is shown a system which embodies the second form of the present invention for side-lobe cancellation. Generally there is shown a directional receiving system for selectively discriminating between a plurality of sources from which emanates detectable wave energy, the sources represented at $S_1(t)$ and $S_2(t)$ lying in different directions from an observation location at which is positioned a first relatively directional signal detecting means 48 and a second relatively nondirectional signal detecting means 50. As shown, it is desired to detect the presence of $S_1(t)$ to the exclusion of $S_2(t)$. Wave energy emanating from $S_1(t)$ and $S_2(t)$ and detected by the directional and relatively nondirectional detecting means is converted into first and second alternating current signals, at first and second receiving means, respectively. Both of the alternating current signals include signal components representative of the wave energy emanating from $S_1(t)$ and $S_2(t)$. In accordance with the present invention, the first and second signals are utilized to develop a difference or remainder signal the magnitude of which represents the alternating current difference between the alternating current signals. The remainder signal and at least one of the alternating current signals are then utilized to produce an output or product signal the magnitude of which is substantially a direct function of the time-averaged product of the remainder signal and the alternating current signal or signals being utilized. In accordance with the second form of the present invention, the product signal, thus produced, is then utilized to provide means for accurately controlling the amplitude of one of the alternating current signals such that the amplitude of the signal component of $S_2(t)$ contained therein is substantially equal to the signal component of $S_2(t)$ present in the other alternating current signal. Thus, upon subtraction of the first and second alternating current signals at a subtracter unit, the remainder signal developed thereat is substantially free of the signal components of $S_2(t)$. Thus, this remainder signal becomes a useful indicator signal.

More specifically, as shown in FIGURE 6, the system includes a directional and a relatively nondirectional or omnidirectional antenna 48 and 50, respectively, and a pair of receivers 52 and 54 which are connected between the antennas and a subtracter circuit 56. More particularly, receiver 52 is connected between directional antenna 48 and a first input terminal of subtracter 56 and receiver 54 is connected between omnidirectional antenna 50 and a second input terminal of subtracter 56. The first input terminal of subtracter circuit 56 is also connected to the first input terminal of a signal comparator, such as a zero-time-delay correlator network depicted at 58. The output of subtracter 56 is connected to the second input terminal of a zero-time-delay correlator 58 whose output is, in turn, connected through a feedback loop to receiver 54. The output of subtracter 56 is also connected to a system output terminal 60.

A zero-time-delay correlator network is a particular adaption of a correlator device which first multiplies two time-varying signals together and then takes a time average of the resultant product. As previously mentioned in connection with FIGURE 3, various types of correlators and the individual circuits used therein which may be adapted for use in the circuit of the present invention are shown and described on pages 31 to 45 of The Harvard University Technical Memorandum No. 27 entitled "Correlators for Signal Reception" by James J. Faran, Jr. and Robert Hills, Jr., published September 15, 1952.

In considering the operation, it will be assumed that two sources are involved, namely, $S_1(t)$ and $S_2(t)$, $S_1(t)$ being a reflective energy source, that is, a target that does not radiate energy but rather reflects energy incident thereon, and $S_2(t)$ being a radiating source. With respect to $S_1(t)$ and $S_2(t)$, it will further be assumed that they are located such that at one moment during the periodical scanning of directional antenna 48, the energy from $S_1(t)$ is received in the direction of the main lobe of the scanning antenna and the energy from $S_2(t)$ is received in the direction of a first side lobe, as illustrated in FIGURE 6. It should be pointed out that the assumptions made above are for convenience only and that the features of the present invention have applicability to broader and more complex situations.

Accordingly, on the basis of energy received from $S_1(t)$ and $S_2(t)$ by receivers 52 and 54 and the various lobe gains mentioned above, the signals produced at the output terminals of antennas 48 and 50 can be written as follows:

$$e_1 = A_0 S_1(t) + A_1 S_2(t) \quad (12)$$

$$e_2 = B_0 S_1(t) + B_0 S_2(t) \quad (13)$$

where $e_1$ is the output of directional antenna 48 and $e_2$ is the output of omnidirectional antenna 50.

Signals $e_1$ and $e_2$ are applied to receivers 52 and 54, respectively, and as a result of the gain factors of the receivers, the output signals produced by receivers 52 and 54 may be mathematically expressed as:

$$e_A = K[A_0 S_1(t) + A_1 S_2(t)] \quad (14)$$

$$e_B = k(\phi) B_0 [S_1(t) + S_2(t)] \quad (15)$$

where $e_A$ is the output signal produced by receiver 52, $e_B$ is the output signal of receiver 54, K is the fixed gain of receiver 52 and $k(\phi)$ is the gain function of receiver 54. It will be recognized that the gain of receiver 54 is a function of $\phi$ which itself is the correlation function. Stated differently, it may be said that the gain of receiver 52, $k(\phi)$, is a function of the output signal $\phi$ of correlator 58.

Signals $e_A$ and $e_B$ are applied to subtracter 56 which produces a signal corresponding to the difference between $e_A$ and $e_B$. Thus, the signal produced by subtracter 56 may be written as $$e_A - e_B = K[A_0 S_1(t) + A_1 S_2(t)] \\ - k(\phi) B_0 [S_1(t) + S_2(t)] \quad (16)$$

which can be reduced to a more concise form, namely, $$e_A - e_B = [KA_0 - k(\phi) B_0] S_1(t) \\ + [KA_1 - k(\phi) B_0] S_2(t) \quad (17)$$

It will be remembered that the prime object of this form of the present invention is to minimize the second or $S_2(t)$ term of Equation 17 from which it will be seen that this object may be achieved by adjusting the gain $k(\phi)$ of receiver 54 such that $k(\phi)$ will at all times substantially equal $KA_1/B_0$. When such an equality exists, the coefficient of the second term of Equation 17 vanishes so that the subtracter output signal $(e_A - e_B)$, which is also the output signal $e_0$ appearing at output terminal 60, includes only the desired $S_1(t)$ component.

Signals $e_A$ and $(e_A - e_B)$ are applied to correlator 58 where they are multiplied together and the product averaged for a predetermined interval of time T. Hence, the correlator output $\phi$, mathematically expressed, is $$\phi = \frac{1}{T} \int_T (e_A)(e_A - e_B) dt \quad (18)$$

By substituting the above-derived values for $e_A$ and $e_B$ in Equation 18, we obtain $$\phi = \frac{1}{T} \int_T K[A_0 S_1(t) + A_1 S_2(t)][[KA_0 - k(\phi) B_0] S_1(t) + \\ [KA_1 - k(\phi) B_0] S_2(t)] dt \quad (19)$$

Since, in accordance with the above assumptions, the magnitude of the signal received from source $S_2(t)$ is very much greater than the magnitude of the signal received from $S_1(t)$, the latter may be ignored with very little error in computing $\phi$. Accordingly, although Equation 19 would normally reduce to Equation 6, for all practical purposes under the above assumptions, Equation 19 may be reduced to:

$$\phi = \frac{1}{T} \int_T [KA_1 S_2(t)][KA_1 - k(\phi)B_0] S_2(t) dt \quad (20)$$

By comparing Equations 17 and 20, it will be noted that the second term of Equation 17 is identical to the second bracketed expression in Equation 20, which means that in order to minimize the second or $S_2(t)$ term of Equation 17, it is also necessary to minimize the function $\phi$. Obviously, $\phi$ is zero when $k(\phi) = KA_1/B_0$ which is also the condition for eliminating the $S_2(t)$ component.

The signal $\phi$ produced by correlator 58 is applied through a feedback loop to receiver 54 wherein the gain is continuously and automatically adjusted in response thereto such that $k(\phi)$ substantially equals $KA_1/B_0$. When this is done, the $S_2(t)$ component of the output signal $e_0$ or $(e_A - e_B)$ produced by subtracter 56 is effectively canceled out and, in consequence thereof, signal $e_0$ at output terminal 60 contains only the $S_1(t)$ component. By referring to Equation 17, it will be seen that $e_0$ thereby is essentially equal to $KA_1 S_1(t)$ which is the desired result. Thus, $e_0$ becomes a useful target indicator signal.

Since the output of correlator 58, namely, $\phi$, is also brought to a minimum with the adjustment of the gain $k(\phi)$ of receiver 54, it will be recognized that receiver 54, subtracter 56, and correlator 58, in addition to their other functions, also constitute the elements of a servo loop which is of a relatively simple nature due to the fortunate circumstance of identity of mathematical expressions as mentioned above.

Having thus described the invention, what is claimed is:

1. In combination:
   a first receiving means for receiving a first alternating current signal;
   a second receiving means for receiving a second alternating current signal;
   subtracter means connected to said first and second receiving means for developing a remainder signal substantially representing the alternating current difference between said first and second signals;
   signal comparator means connected to said subtracter means and at least one of said receiving means for developing an output signal substantially representing the time-averaged product of signals applied to said comparator means; and
   means connected to said signal comparator means for utilizing said output signal.

2. A direction finding system for selectively detecting the position relative to an observation location of different ones of a plurality of sources from which emanate detectable wave energy, comprising in combination:
   a first relatively directional receiving means for developing a first alternating current signal corresponding to wave energy received by said first receiving means;
   a second relatively nondirectional receiving means for developing a second alternating current signal corresponding to wave energy received by said second receiving means;
   subtracter means connected to said first and second receiving means for developing a remainder signal representing the alternating current difference between said first and second alternating current signals; and
   signal comparator means connected to said subtracter means and at least one of said receiving means for developing an output signal which is a time-averaged product of signals applied to said comparator means, variations in the magnitude of said output signal depicting position selective detection of sources emanating wave energy relative to the observation location.

3. In a direction finding system for selectively discriminating between a plurality of sources from each of which is emanated detectable wave energy, said sources lying in respectively different directions from an observation location, at which location is positioned a first, relatively directional and positionable receiving means including means responsive to wave energy detected thereby for developing a first alternating current signal having first and second signal components corresponding to wave energy emanating from first and second sources, respectively, and a second, relatively nondirectional receiving means including means responsive to wave energy detected thereby for developing a second alternating current signal having first and second signal components corresponding to wave energy emanating from said first and second sources, respectively, the combination of:
   means responsive to said first and second alternating current signals for developing a remainder signal the magnitude of which represents the alternating current difference between said first and second alternating current signals; and
   means responsive to said remainder signal and at least one of said alternating current signals for developing an output signal the magnitude of which is substantially a direct function of the difference between time-averaged, squared values of said first and second signal components associated with a one of said receiving means such that variations in the magnitude of said output signal depict position selective detection of said sources of wave energy relative to said observation location.

4. In a direction finding system for selectively discriminating between a plurality of sources from each of which is emanated detectable wave energy, said sources lying in respectively different directions from an observation location, at which location is positioned a first, relatively directional and positionable receiving means including means responsive to wave energy detected thereby for producing a first alternating current signal having first and second signal components corresponding to wave energy emanating from first and second sources, respectively, the combination of:
   a second, relatively nondirectional receiving means;
   means responsive to the wave energy detected by said second receiving means for developing a second alternating current signal having first and second signal components corresponding to wave energy emanating from said first and second sources, respectively;
   means responsive to said first and said second alternating current signals for developing a remainder signal the magnitude of which represents the alternating current difference between said first and second alternating current signals; and
   means responsive to said remainder signal and at least one of said alternating current signals for developing a substantially direct current output signal the magnitude of which is substantially a direct function of the difference between the time-averaged, squared values of said first and second signal components associated with a one of said receiving means such that variations in the magnitude of said output signal depict position selective detection of said sources of wave energy relative to said observation location.

5. A direction finding system for selectively detecting the position relative to an observation location of ones of a plurality of sources from each of which is emanated detectable wave energy, comprising in combination:
   a first, relatively directional and positionable receiving means;
   a second, relatively nondirectional receiving means;
   means responsive to wave energy detected by said first receiving means for developing a first alternating current signal having first and second signal components corresponding to wave energy emanating from first and second sources, respectively;
   means responsive to wave energy detected by said second receiving means for developing a second alternating current signal having first and second signal components corresponding to wave energy emanating from said first and second sources, respectively;

means responsive to said first and second alternating current signals for developing a remainder signal the magnitude of which represents the alternating current difference between said first and second alternating current signals; and means responsive to said remainder signal and at least one of said alternating current signals for developing an output signal the magnitude of which is substantially a direct function of the difference between the time-averaged, squared values of said first and second signal components associated with a one of said receiving means such that variations in the magnitude of said output signal depict position selective detection of said sources of wave energy relative to said observation location.

6. A direction finding system for selectively detecting the position relative to an observation location of ones of a plurality of sources from each of which is emanated detectable wave energy, comprising in combination:

a substantially directional and positionable antenna having a major lobe and a plurality of minor lobes;

a substantially nondirectional antenna having a gain less than the major lobe and greater than the largest minor lobe of said directional antenna;

means responsive to the wave energy received by said directional antenna for developing a first alternating current signal;

means responsive to wave energy detected by said non-directional antenna for developing a second alternating current signal;

means responsive to said first and second alternating current signals for developing a remainder signal the magnitude of which represents the alternating current difference between said first and second alternating current signals; and means responsive to said remainder signal and at least one of said alternating current signals for developing an output signal the magnitude of which is substantially a direction function of the difference between time-averaged, squared values of the energy detected by said major and minor lobes of said directional antenna such that variations in the magnitude of said output signal depict position selective detection of said sources of wave energy relative to said observation location.

7. In a direction finding system for selectively discriminating between a plurality of sources from each of which is emanated detectable wave energy, said sources lying in respectively different directions from an observation location, at which location is positioned a first relatively directional and positionable receiving means including means responsive to the wave energy detected thereby for developing a first alternating current signal having first and second signal components corresponding to the wave energy emanating from first and second sources, respectively, the combination of:

a second, relatively nondirectional receiving means;

means responsive to wave energy detected by said second receiving means for developing a second alternating current signal having first and second signal components corresponding to wave energy emanating from said first and second sources, respectively;

means responsive to said first and second alternating current signals for developing a remainder signal the magnitude of which represents the alternating current difference between said first and second alternating current signals; and multiplying means responsive to said remainder signal and at least one of said alternating current signals for developing an output signal, said multiplying means including means for time-averaging said output signal over a period of time sufficient to substantially free said output signal of variations attributable to cross-product terms produced by multiplication of said first and second signal components such that the magnitude of said output signal substantially corresponds to the difference between the time-averaged, squared values of said first and second signal components associated with a one of said receiving means whereby variations in the magnitude of said output signal depict position selective detection of said sources of wave energy relative to said observation location.

8. A detection finding arrangement as defined in claim 7 wherein said multiplying means is a signal correlator.

9. Apparatus for substantially increasing the ability of a directional receiver system to determine the bearing angles of radiating energy sources irrespective of the relative magnitudes of the main and minor lobe signal components of the system output signal, said apparatus comprising:

means receptive of signals from energy sources whose signals are also received by the directional receiver system in the direction of the main and minor lobes of the field pattern thereof, said means being responsive to said received signals for producing a composite signal having first and second signal components corresponding to said main and minor lobe signal components, respectively, the amplitudes of said first and second components being respectively less and greater than the respective amplitudes of said main and minor lobe components;

difference means for subtracting said composite signal from the system output signal to produce a difference signal having third and fourth signal components whose amplitudes correspond to the difference in amplitude between the main lobe and said first signal components and the minor lobe and said second signal components, respectively; and output means for first multiplying the system output signal and said difference signal together and then averaging the product thereof for a predetermined interval of time to produce a positive direct-current voltage.

10. Directional receiver apparatus for determining the bearing angle of radiating energy sources irrespective of their relative signal intensities, said apparatus comprising:

a directional receiver system responsive to signals simultaneously received from first and second sources in the direction of the main and minor lobes, respectively, of the system antenna pattern for producing a first output signal having main and minor lobe signal components corresponding respectively to said first and second signals;

means receptive of said first and second signals and responsive thereto for producing a second output signal having first and second signal components corresponding to said main and minor lobe signal components, respectively, the amplitudes of said first and second components being respectively less and greater than the respective amplitudes of said main and minor lobe components;

additional means for subtracting said second output signal from said first output signal to produce a difference signal having third and fourth signal components whose amplitudes correspond to the difference in amplitude between said main lobe and first signal components and said minor lobe and second signal components, respectively; and output means for first multiplying together said first output and difference signals and then averaging the product thereof over a predetermined interval of time to produce a positive direct-current voltage.

11. The apparatus defined in claim 9 wherein said output means includes a zero-time-delay correlator.

12. Directional receiver apparatus for determining the bearing angle of a first radiating signal source when the signal received therefrom is masked by the signal received from a second such source, said apparatus comprising:

a directional receiver having gain factors of $A_0$ and $A_1$ for signals received in the direction of the main and minor lobes, respectively, of the directional antenna field pattern, said directional receiver being responsive to signals $S_1(t)$ and $S_2(t)$ simultaneously re-received from the first and second sources in the direction of the main and minor lobes, respectively, to produce a signal $e_A = A_0 + S_1(t) + A_1 S_2(t)$; an omnidirectional receiver having a gain factor of $B_0$ such that $A_1 \leq B_0 < A_0$, said omnidirectional receiver being responsive to said simultaneously received signals $S_1(t)$ and $S_2(t)$ to produce a signal $$e_B = B_0 S_1(t) + B_0 S_2(t)$$

difference means for subtracting signal $e_B$ from signal $e_A$ to produce a signal $$e_C = (A_0 - B_0) S_1(t) + (A_1 - B_0) S_2(t)$$

and output means for multiplying signals $e_A$ and $e_C$ together and then averaging the product thereof for a predetermined interval of time to produce an output signal $$E_0 = \frac{1}{T} \int_T A_0(A_0 - B_0)[S_1(t)]^2 dt + \frac{1}{T} \int_T A_1(A_1 - B_0)[S_2(t)]^2 dt$$

said first and second integrals yielding positive and negative direct-current voltages, respectively, the positive and negative direct-current voltages, respectively, the positive voltage being greater than the negative voltage.

13. The apparatus defined in claim 12 wherein said output means includes a zero-time-delay correlator.

14. An improved directional receiver system that can reliably determine the bearing angle of a first radiating signal source in the presence of a second radiating signal source whose signal would ordinarily mask the signal from the first source, said system comprising:

a periodically scanning directional antenna having gains of $A_0$ and $A_1$ for signals received in the direction of its main and first side lobes, respectively, said antenna, in response to signals $S_1(t)$ and $S_2(t)$ simultaneously received from the first and second sources in the direction of the main and first side lobes, respectively, producing a signal $e_1 = A_0 S_1(t) + A_1 S_2(t)$;

first means electrically coupled to said directional antenna for amplifying signal $e_1$ to produce a signal $e_A = K[A_0 S_1(t) + A_1 S_2(t)]$, where K is the gain of said first means;

an omnidirectional antenna positioned in the proximity of said directional antenna and having a gain $B_0$ such that $A_1 \leq B_0 < A_0$, said antenna, in response to signals $S_1(t)$ and $S_2(t)$ simultaneously received from the first and second sources, producing a signal $e_2 = B_0 S_1(t) + B_0 S_2(t)$;

second means electrically coupled to said omnidirectional antenna for amplifying signal $e_2$ to produce a signal $e_B = K B_0 [S_1(t) + S_2(t)]$;

difference means for subtracting signal $e_B$ from signal $e_A$ to produce a signal $$e_C = K(A_0 - B_0) S_1(t) + K(A_1 - B_0) S_2(t)$$

and a zero-time-delay correlator network for initially multiplying signals $e_A$ and $e_C$ together and then averaging the product thereof for a predetermined interval of time to produce an output signal $$E_0 = \frac{1}{T} \int_T K A_0(A_0 - B_0)[S_1(t)]^2 dt + \frac{1}{T} \int_T K A_1(A_1 - B_0)[S_2(t)]^2 dt$$

said first and second integrals yielding positive and negative direct-current voltages, respectively, the sum of said positive and negative voltages being positive.

15. In a direction finder system of the type wherein a directional receiver having gains of $A_0$ and $A_1$ for signals received from radiating signal sources in the direction of the main and minor lobes, respectively, of the directional receiver antenna field pattern produces a first output signal having main and minor lobe signal components, wherein an omnidirectional receiver having a gain of $B_0$, such that $A_c \leq B_0 < B_1$, is receptive of the signals received by the directional receiver to produce a second output signal having first and second signal components corresponding to said main and minor lobe components, respectively, and wherein a difference circuit subtracts said first signal component from said main lobe component and said second signal component from said minor lobe signal component to produce a third output signal having third and fourth signal components, the combination with said directional receiver and difference circuit of: first and second means for respectively multiplying said first and third output signals together and then averaging the product thereof for a predetermined interval of time to produce an output voltage having positive and negative direct-current voltage components corresponding to said main and minor lobe components, respectively, the sum of said positive and negative direct-current voltages being positive only when a signal from a radiating signal source is received by said directional receiver in the direction of its main lobe.

16. In combination:

a first receiving means for receiving a first alternating current signal;

a second receiving means for receiving a second alternating current signal;

subtractor means connected to said first and second receiving means for developing a remainder signal representing the alternating current difference between said first and said second signals;

signal comparator means connected to said subtractor means and at least one of said receiving means for developing a product signal which is substantially proportional to the time-averaged product of signals applied to said comparator means; and means responsive to said product signal for controlling the amplitude of a one of said alternating current signals.

17. In combination with an arrangement including a first receiving means for receiving a first alternating current signal, a second receiving means for receiving a second alternating current signal, subtracter means connected to said first and second receiving means for developing a remainder signal representing the alternating current difference between said first and said second signals.

signal comparator means connected to said subtracter means and at least one of said receiving means for developing a product signal which is substantially proportional to the time-averaged product of signals applied to said comparator means; and means responsive to said product signal for controlling the amplitude of one of said alternating current signals.

18. A direction finding system for selectively detecting the position relative to an observation location of ones of a plurality of sources from which emanates detectable wave energy, comprising in combination:

a first relatively directional and positionable signal detecting means;

first receiving means connected to said first detecting means and responsive to wave energy detected by said first detecting means for developing a first alternating current signal having first and second signal components corresponding to wave energy emanating from first and second sources, respectively;

a second relatively nondirectional signal detecting means;

a second receiving means connected to said second detecting means and responsive to the wave energy detected by said second detecting means for developing a second alternating current signal having first and second signal components respectively corresponding to wave energy emanating from said first and second sources, respectively;

subtracter means connected to said first and second receiving means and responsive to said first and second alternating current signals for developing a remainder signal representing the alternating current difference between said first and second alternating current signals;

multiplier means connected to said subtracter means and at least one of said receiving means and responsive to said remainder signal and at least one of said alternating current signals for developing a product signal, said multiplier means including means for time averaging said product signal; and means connected to said multiplier means and responsive to said product signal for controlling the amplitude of a one of said alternating current signals such that said remainder signal includes substantially only components corresponding to said first signal components.

19. A direction finding system for selectively detecting the position relative to an observation location of ones of a plurality of sources from which emanates detectable wave energy, comprising in combination:

a first relatively directional and positionable antenna;

first receiving means connected to said first antenna and responsive to wave energy detected by said first antenna for developing a first alternating current signal having first and second signal components corresponding to wave energy emanating from first and second sources respectively;

a second relatively nondirectional antenna;

second receiving means having a variable gain connected to said second antenna and responsive to the wave energy detected by said second receiving means for developing a second alternating current signal having first and second signal components corresponding to wave energy emanating from said first and second sources, respectively;

substracter means connected to said first and second receiving means and responsive to said first and second alternating current signals for developing a remainder signal the magnitude of which represents the alternating current difference between said first and second alternating current signals;

multiplier means connected to said subtracter means and at least one of said receiving means for developing a product signal, said multiplier means including time-averaging means for time-averaging said product signal; and means connected to said multiplier means for controlling the gain of a one of said receiving means in response to said product signal.

20. Apparatus for substantially eliminating the undesirable minor-lobe component normally contained in the output signal produced by a directional receiver system in response to signals simultaneously received from nonradiating and radiating signal sources in the direction of the main and minor lobes, respectively, of the system antenna field pattern, said apparatus comprising:

means receptive of the signals from the radiating and nonradiating signal sources and operable in response thereto to automatically and continuously produce a subtrahend signal containing a signal component that is substantially equal in magnitude to the minor-lobe component of the output signal; and means for modulating the output signal of the directional receiver system with a signal derived from said subtrahend signal to produce another output signal which is substantially free of said minor-lobe component while retaining the main lobe component of the output signal substantially undiminished.

21. A direction finder system for locating a nonradiating target in the presence of a relatively powerful radiating signal source whose signal would ordinarily mask the signal reflected from the nonradiating target, said system comprising:

a directional receiver operable in response to signals received from the target and source in the direction of the main and minor lobes, respectively, of the receiver antenna field pattern to produce a first output signal having main and minor lobe signal components;

means receptive of the signals from the target and source and operable in response thereto to automatically and continuously produce a subtrahend signal containing a signal component corresponding to said minor lobe signal component and substantially equal in magnitude thereto; and means for modulating the output signal of said directional receiver with a signal derived from said subtrahend signal to produce another output signal which is substantially free of said minor-lobe component while retaining the main lobe component of the output signal substantially undiminished.

22. Apparatus for substantially eliminating the undesirable minor-lobe component normally contained in the output signal produced by a directional receiver system in response to signals simultaneously received from nonradiating and radiating signal sources in the direction of the main and minor lobes, respectively, of the system antenna field pattern, said apparatus comprising:

omnidirectional means receptive of the signals from the radiating and nonradiating signal sources and operable in response thereto to produce a subtrahend signal containing first and second signal components corresponding to the signals received from the radiating and nonradiating sources, respectively, said omnidirectional means including an automatic-gain-control circuit operable in response to signals applied thereto to adjust the amplitude of said subtrahend signal in accordance with the amplitudes of the applied signals;

difference means for subtracting said subtrahend signal from the output signal to produce an additional output signal having third and fourth signal components, the amplitude of said third component being equal to the difference in amplitudes between the main-lobe and said first components and the amplitude of said fourth component being equal to the difference in amplitudes between the minor-lobe and said second components; and means for first multiplying together the directional receiver output signal and said additional output signal and then averaging the product thereof to produce a feedback signal which is applied to said gain-control-circuit, the amplitude of said feedback signal varying in such a manner that the amplitude of said second signal component is at all times substantially equal to the amplitude of the minor-lobe signal component.

23. The apparatus defined in claim 22 wherein said means is a zero-time-delay correlator network.

24. An improved directional receiver system that can locate a nonradiating target in the presence of a powerful radiating target whose signal would ordinarily mask the signal from the nonradiating target, said system comprising:

a directional antenna rotatably mounted to periodically scan the regions of space and having associated therewith a field pattern including main and minor lobes, said antenna, at one point in its periodical scan, simultaneously receiving a first signal from a nonradiating target in the direction of its main lobe and a second signal from a radiating target in the direction of its minor lobe;

a first receiver responsive to said first and second signals to produce a first output signal having first and second signal components corresponding to the first and second signals, respectively;

an omnidirectional antenna positioned in the proximity of said directional antenna to simultaneously receive said first and second signals;

a second receiver responsive to the first and second signals received by said omnidirectional receiver to produce a second output signal having third and fourth signal components corresponding to said first and second signals, respectively, said second receiver including an automatic-gain-control circuit operable in response to signals applied thereto to adjust the amplitude of said third and fourth components in accordance with the amplitudes of the applied signals;

a difference circuit for substracting said second output signal from said first output signal to produce a third output signal having fifth and sixth signal components corresponding to said first and second signals, respectively, the amplitude of said fifth component being equal to the difference in amplitudes between said first and third components and the amplitude of said sixth component being equal to the difference in amplitudes between said second and fourth components; and means for first multiplying together said first and third signals and then averaging the product thereof to produce a feedback signal which is applied to said gain-control-circuit, the amplitude of said feedback signal varying in such a manner that the amplitude of said fourth signal component is at all times maintained substantially equal to the amplitude of said second signal component, whereby said third output signal is rendered substantially free from any signal component associated with the radiating source.

25. An improved directional receiver system that can locate a nonradiating target in the presence of a powerful radiating target whose signal would ordinarily mask the signal from the nonradiating target, said system comprising:

a periodically scanning directional antenna having gains of $A_0$ and $A_1$ for signals received in the direction of its main and minor lobes, respectively, said antenna, in response to signals $S_1(t)$ and $S_2(t)$ simultaneously received from the nonradiating and radiating targets in the direction of the main and minor lobes, respectively producing a signal $e_1 = A_0 S_1(t) + A_1 S_2(t)$;

a first receiver having a fixed gain K such that, in response to signal $e_1$, said first receiver produces a signal $e_A = [KA_0 S_1(t) + A_1 S_2(t)]$; an omnidirectional antenna positioned in the proximity of said directional antenna and having a gain $B_0$ such that $$A_1 \leq B_0 < A_0$$

said antenna, in response to signals $S_1(t)$ and $S_2(t)$ simultaneously received from the nonradiating and radiating targets, respectively, producing a signal $e_2 = B_0 S_1(t) + B_0 S_2(t)$;

a second receiver having a variable gain $k(\phi)$ such that, in response to signal $e_2$, said second receiver produces a signal $e_B = k(\phi) B_0 [S_1(t) + S_2(t)]$, said second receiver including an automatic-gain-control circuit for varying the gain $k(\phi)$ in accordance with the amplitude of signals applied thereto;

a difference circuit for subtracting signal $e_B$ from $e_A$ to produce an output signal $$e_0 = [KA_0 - k(\phi) B_0] S_1(t) + [KA_1 - k(\phi) B_0] S_2(t)$$

and means for first multiplying together signals $e_A$ and $e_0$ and then averaging the product thereof to produce a feedback signal $$\phi \cong \frac{1}{T} \int_T [KA_1 S_2(t)][KA_1 - k(\phi) B_0] S_2(t) dt$$

which is applied to said gain-control circuit, the amplitude of said feedback signal varying in such a manner that $k(\phi)$ is at all times maintained substantially equal to $KA_1/B_0$, whereby the $S_2(t)$ component of signal $e_0$ is substantially cancelled out.

References Cited by the Examiner

UNITED STATES PATENTS 2,825,900   3/1958   Collbohm _____ 343—100

CHESTER L. JUSTUS, *Primary Examiner.*

R. E. BERGER, *Assistant Examiner.*